United States Patent
Yasuda

(10) Patent No.: US 10,781,884 B2
(45) Date of Patent: Sep. 22, 2020

(54) POWER TRANSMISSION DEVICE

(71) Applicant: EXEDY Corporation, Neyagawa-shi, Osaka (JP)

(72) Inventor: Keiichi Yasuda, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/275,807

(22) Filed: Feb. 14, 2019

(65) Prior Publication Data
US 2019/0293149 A1 Sep. 26, 2019

(30) Foreign Application Priority Data

Mar. 20, 2018 (JP) ................................. 2018-051996

(51) Int. Cl.
*F16F 15/18* (2006.01)
*B60W 30/20* (2006.01)

(52) U.S. Cl.
CPC ............ *F16F 15/18* (2013.01); *B60W 30/20* (2013.01)

(58) Field of Classification Search
CPC ........ F16F 15/1206; F16F 15/18; F16F 15/14; F16F 15/30; B60W 30/02; B60K 17/02; F16H 45/02; F16H 61/143; F16D 3/06; F16D 3/12
USPC ......... 188/82.1, 82.7, 82.8, 181 T; 192/3.28, 192/3.29, 45.1, 48.611, 70.12; 475/258; 477/107, 168, 176
See application file for complete search history.

(56) References Cited

U.S. PATENT DOCUMENTS

| 8,287,430 | B2 * | 10/2012 | Winkler | ................. | B60K 6/105 |
| | | | | | 477/107 |
| 8,827,861 | B2 * | 9/2014 | Murata | ............... | F16F 15/1206 |
| | | | | | 475/258 |
| 10,125,844 | B2 * | 11/2018 | Dogel | ..................... | F16H 45/02 |
| 2005/0210971 | A1 * | 9/2005 | Satoh | ..................... | F16D 48/06 |
| | | | | | 73/114.04 |
| 2019/0178323 | A1 * | 6/2019 | Ito | ............................ | F16F 1/10 |

FOREIGN PATENT DOCUMENTS

WO 2012/053091 A1 4/2012

\* cited by examiner

*Primary Examiner* — Christopher P Schwartz
(74) *Attorney, Agent, or Firm* — United IP Counselors, LLC

(57) ABSTRACT

A power transmission device is disclosed. The power transmission device includes an input member, an output member, a dynamic vibration absorbing device, a rotation fluctuation detecting unit, and a control unit. The input member is rotatably disposed and configured to receive the torque inputted from a drive source. The output member is configured to output the torque, inputted to the input member, to a drive wheel. The dynamic vibration absorbing device is disposed in a power transmission path including the input member and the output member. The rotation fluctuation detecting unit is configured to detect information regarding a rotational fluctuation in at least one of the input member and the output member. The control unit is programmed to perform active control of the dynamic vibration absorbing device so as to reduce the rotational fluctuation based on the information regarding the rotational fluctuation detected by the rotational fluctuation detecting unit.

4 Claims, 8 Drawing Sheets

POWER TRANSMISSION DEVICE

CROSS-REFERENCE TO RELATED APPLICATIONS

This application claims priority to Japanese Patent Application No. 2018-051996, filed Mar. 20, 2018. The contents of that application are incorporated by reference herein in their entirety.

TECHNICAL FIELD

The present disclosure relates to a power transmission device.

BACKGROUND ART

A clutch device having a damper mechanism and a power transmission device such as a torque converter are installed between a drive source and a drive wheel. This power transmission device includes a dynamic vibration absorbing device to prevent resonance due to vibrations from the drive source.

For example, a dynamic damper device disclosed in International Patent Publication No. WO 2012/053091 variably controls an inertia mass of a damper mass and also variably controls a damping force with respect to an elastic body in order to appropriately reduce vibrations.

BRIEF SUMMARY

In the dynamic damper device of International Patent Publication No. WO 2012/053091 as described above, the dynamic damper device is controlled so as to appropriately mitigate the vibrations caused by a primary combustion of a drive source. However, the resonance frequency of a drive system fluctuates depending on a traveling state of the drive system, for example, the gear shift stage; hence, there is a possibility that resonance cannot be appropriately mitigated even with the dynamic damper device as described above. Therefore, the present disclosure has been made to accomplish an objective of providing a power transmission device capable of mitigating such resonance more appropriately.

A power transmission device according to an aspect of the present disclosure is configured to transmit a torque from a drive source to drive wheels. This power transmission device includes an input member, an output member, a dynamic vibration absorbing device, a rotation fluctuation detecting unit, and a control unit. The input member is rotatably disposed and receives a torque from a drive source. The output member outputs the torque that is inputted to the input member to the driving wheel. The dynamic vibration absorbing device is disposed in a power transmission path that includes the input member and the output member. The rotation fluctuation detecting unit detects information regarding the rotational fluctuation in at least one of the input member and the output member. Based on the information detected by the rotation fluctuation detecting unit, the control unit performs active control of the dynamic vibration absorbing device so as to reduce the rotational fluctuation.

According to this configuration, the rotational fluctuation of the input member or the output member, both of which are members constituting the power transmission device, is detected, and then the dynamic vibration absorbing device is controlled. Thereby, the influence caused by a torsion of the drive system is decreased and the resonance is mitigated more appropriately.

Preferably, the power transmission device further includes a housing. The housing accommodates the input member, the output member, and the dynamic vibration absorbing device.

Preferably, the rotation fluctuation detecting unit is exposed in the housing.

Preferably, the dynamic vibration absorbing device includes a body member and an inertia member that is rotatable within a range of a predetermined torsional angle relative to the body member. When the control unit has determined that the rotational fluctuation of the input member or the output member exceeds a threshold value based on the information regarding the rotational fluctuation detected by the rotational fluctuation detecting unit, the control unit prohibits the inertia member from rotating relative to the body member.

According to the present disclosure, the resonance can be more appropriately mitigated.

DETAILED DESCRIPTION

Hereinafter, embodiments of a power transmission device according to the present disclosure will be described with reference to the drawings.

[Overall Configuration]

Figure 1:
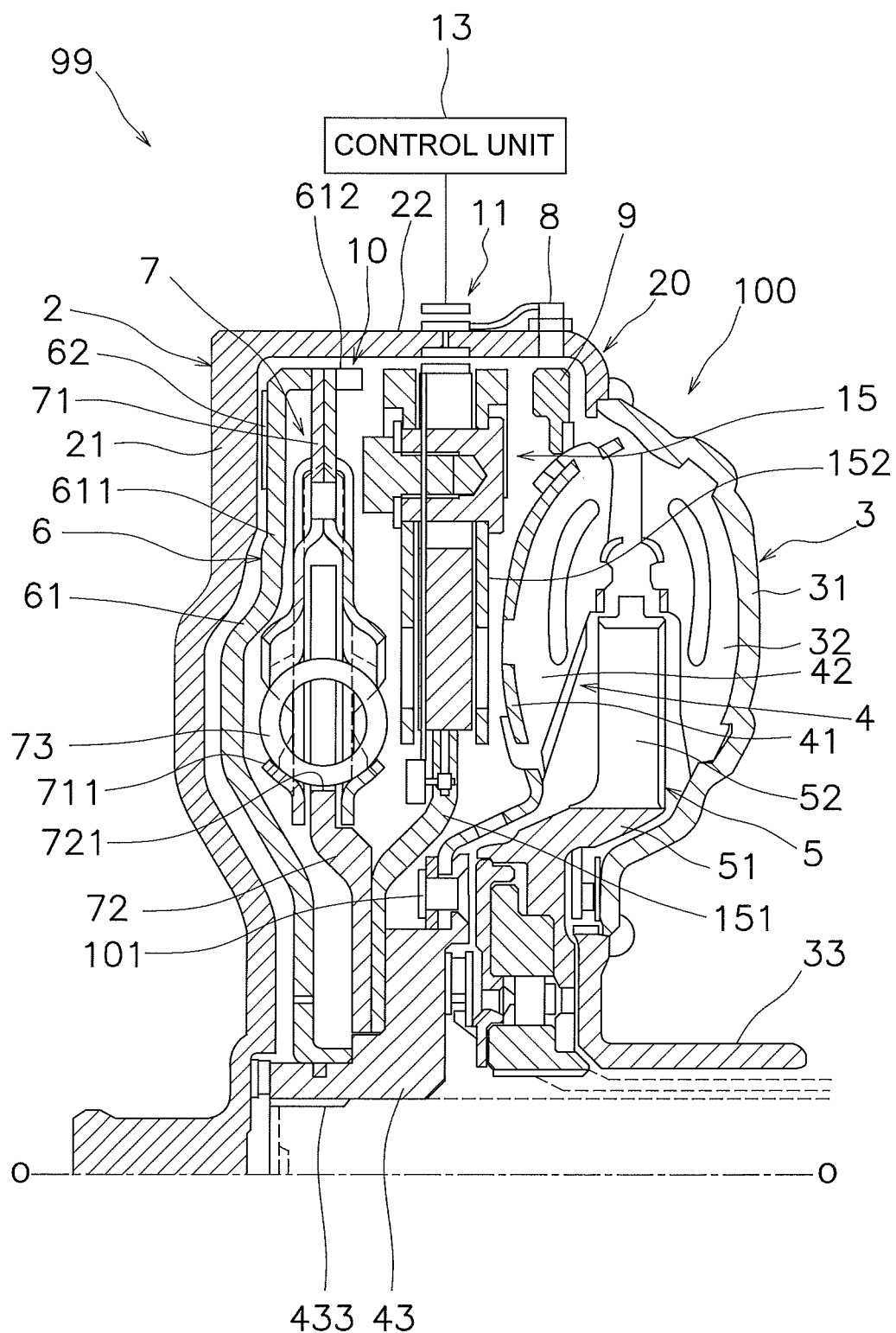
FIG. 1 is a cross-sectional view of a power transmission device.

FIG. 1 is a cross-sectional view of a power transmission device 99 according to an embodiment of the present disclosure. The power transmission device 99 includes a torque converter 100. In the following description, the term "axial direction" means an extending direction of a rotational axis O of the torque converter 100. In addition, the term "circumferential direction" refers to a circumferential direction of a circle about the rotational axis O of the torque converter, and the term "radial direction" means a radial direction of a circle about the rotational axis O of the torque converter. The inner side in the radial direction refers to a side approaching the rotational axis O in the radial direction and the outer side in the radial direction refers to a side moving away from the rotational axis O in the radial direction. It should be noted that an engine is disposed on the left side of FIG. 1 whereas a transmission is disposed on the right side of FIG. 1, although the engine and the transmission are not shown in the drawing.

The torque converter 100 is configured to transmit torque from an engine, which is a drive source, to the drive wheels. The torque converter 100 is rotatable around the rotational axis O. The torque converter 100 includes a front cover 2, an impeller 3, a turbine 4, a stator 5, a lock-up device 10, and a dynamic vibration absorbing device 15. The power transmission device 99 includes the torque converter 100, a rotation sensor 8, a power supply unit 11, and a control unit 13.

[Front Cover]

Torque from the engine is inputted to the front cover 2. The front cover 2 includes a disc part 21 and a first tubular part 22. The first tubular part 22 extends in the axial direction from an outer peripheral end part of the disc part 21 toward the impeller 3.

[Impeller 3]

The impeller 3 includes an impeller shell 31, a plurality of impeller blades 32, and an impeller hub 33. An outer peripheral end part of the impeller shell 31 is fixed to a front tip part of the first tubular part 22 of the front cover 2. For example, the impeller shell 31 is fixed to the front cover 2 by welding.

The impeller blades 32 are fixed to the inner surface of the impeller shell 31. The impeller hub 33 is fixed to the inner peripheral part of the impeller shell 31 by welding or the like.

The impeller shell 31 and the front cover 2 constitute a housing 20 of the torque converter 100. The interior of the housing 20 is filled with fluid. More specifically, the interior of the housing 20 is filled with hydraulic oil. The housing 20 is rotatably disposed and receives a torque transmitted from the engine.

[Turbine 4]

The turbine 4 is disposed so as to face the impeller 3. The turbine 4 includes a turbine shell 41, a plurality of turbine blades 42, and a turbine hub 43. Note that in the present embodiment, when the lock-up device 10 is in the lock-up ON state, the turbine 4 corresponds to the output member of the present disclosure.

The turbine shell 41 is fixed to the turbine hub 43 by rivets 101. The turbine blades 42 are fixed to the inner surface of the turbine shell 41 by brazing or the like. A spline hole 433 is formed in an inner peripheral surface of the turbine hub 43. An input shaft of the transmission is spline-fitted to the spline hole 433.

[Stator 5]

The stator 5 is configured to rectify the hydraulic fluid that returns from the turbine 4 to the impeller 3. The stator 5 is rotatable around the rotational axis O. The stator 5 includes a stator carrier 51 and a plurality of stator blades 52.

[Lock-Up Device 10]

The lock-up device 10 is configured to mechanically transmit torque from the front cover 2 to the turbine hub 43 in the lock-up ON state. The lockup device 10 is disposed between the front cover 2 and the turbine 4 in the axial direction. Further, the lock-up device 10 is disposed in the housing 20. The lock-up device 10 includes a clutch part 6 and a damper mechanism 7. Note that in the present embodiment, when the lock-up device 10 is in the lock-up ON state, the clutch part 6 of the lock-up device 10 corresponds to the input member of the present disclosure.

The clutch unit 6 includes a piston 61 and a friction member 62. The piston 61 has a disc shape and includes a through hole in the center thereof. The turbine hub 43 extends through the through hole of the piston 61. The outer circumferential surface of the turbine hub 43 and the inner circumferential surface of the piston 61 are sealed to each other.

The piston 61 is disposed so as to be rotatable relative to the housing 20. Furthermore, the piston 61 is disposed so as to be rotatable relative to the turbine hub 43. The piston 61 is disposed movably in the axial direction. More specifically, the piston 61 is slidable on the turbine hub 43 in the axial direction.

The piston 61 includes a piston body 611 and a second tubular part 612. The piston body 611 has a disc shape and faces the disc part 21 of the front cover 2. The second tubular part 612 extends in the axial direction from an outer peripheral end part of the piston body 611. More specifically, the second tubular part 612 extends from an outer peripheral end part of the piston body 611 in a direction away from the front cover 2. The outer peripheral surface of the second tubular part 612 faces the inner peripheral surface of the first tubular part 22 of the front cover 2.

The friction member 62 is annular in shape. The friction member 62 is fixed to the piston 61. More specifically, the friction member 62 is fixed to an outer peripheral end part of the piston 61. The friction member 62 is disposed so as to face the disc part 21 of the front cover 2. The friction member 62 and the disc part 21 of the front cover 2 oppose each other in the axial direction.

The clutch part 6 is movable in the axial direction between a frictional engagement position and a release position. When the clutch part 6 is in the frictional engagement position, the clutch part 6 frictionally engages with the housing 20. More specifically, upon moving the clutch part 6 in the axial direction to the side of the front cover 2 (the left side in FIG. 1), the friction member 62 of the clutch part 6 comes in contact with the disc part 21 of the front cover 2 and frictionally engages therewith. As a result, the clutch part 6 is brought into a frictional engagement state and rotates integrally with the front cover 2. Under this frictional engagement state, the torque inputted to the front cover 2 is outputted from the turbine hub 43 via the lock-up device 10. The lock-up device 10 enters the lock-up ON state when the clutch part 6 is in the frictional engagement position as described above.

When the clutch part 6 is in the release position, the frictional engagement between the friction member 62 and the housing 20 is released. More specifically, as the clutch part 6 moves in the axial direction away from the front cover 2 (the right side in FIG. 1), the friction member 62 of the clutch part 6 separates from the disc part 21 of the front cover 2 and is no longer in contact with the disc part 21. As a result, the clutch part 6 is brought into a released state in which the frictional engagement between the friction member 62 and the disc part 21 is released, and becomes rotatable relative to the front cover 2. Note that in this released state, the torque inputted to the front cover 2 is outputted from the turbine hub 43 via the impeller 3 and the turbine 4. The lock-up device 10 enters the lock-up OFF state when the clutch part 6 is in the release position as described above.

In addition, the clutch unit 6 can assume a slip state. In this slip state, while the friction member 62 and the disc part 21 are in contact with each other, the clutch unit 6 is frictionally engaged with a force that is weaker than that in the frictional engagement state. Therefore, the friction member 62 and the disc part 21 are caused to slip while being frictionally engaged. Under the slip state, part of the torque inputted to the front cover 2 is outputted from the turbine hub 43 via the impeller 3 and the turbine 4 while the rest of the torque is outputted from the turbine hub 43 via the lock-up device 10.

The damper mechanism 7 is disposed between the piston 61 and the turbine 4 in the axial direction. The damper mechanism 7 includes a drive plate 71, a driven plate 72, and a plurality of torsion springs 73.

The drive plate 71 is formed in a disc shape, and an outer peripheral end part thereof is engaged with the piston 61. Therefore, the drive plate 71 rotates integrally with the piston 61. Moreover, the drive plate 71 and the piston 61 move relative to each other in the axial direction. The drive plate 71 has a plurality of accommodating parts 711 arranged at intervals in the circumferential direction.

The driven plate 72 is formed in a disc shape. The driven plate 72 is fixed to the turbine hub 43. More specifically, an inner peripheral end part of the driven plate 72 is fixed to the turbine hub 43 by welding or the like. The driven plate 72 has a plurality of accommodating parts 721 arranged at intervals in the circumferential direction. The accommodating parts 721 of the driven plate 72 are disposed so as to overlap with the accommodating parts 711 of the drive plate 71 as viewed in the axial direction.

The torsion springs 73 are housed in the accommodating parts 711 of the drive plate 71 and the accommodating parts 721 of the driven plate 72. The torsion springs 73 elastically couple the drive plate 71 and the driven plate 72. Therefore, the driven plate 72 can rotate relative to the drive plate 71 within a predetermined range of the torsional angle.

With the above configuration, the torque inputted to the clutch part 6 is outputted from the turbine hub 43 via the drive plate 71, the torsion springs 73, and the driven plate 72.

[Dynamic Vibration Absorbing Device]

The dynamic vibration absorbing device 15 is disposed between the lock-up device 10 and the turbine 4 in the axial direction. The dynamic vibration absorbing device 15 is attached to the turbine 4. More specifically, the dynamic vibration absorbing device 15 is attached to the turbine hub 43.

Figure 2:
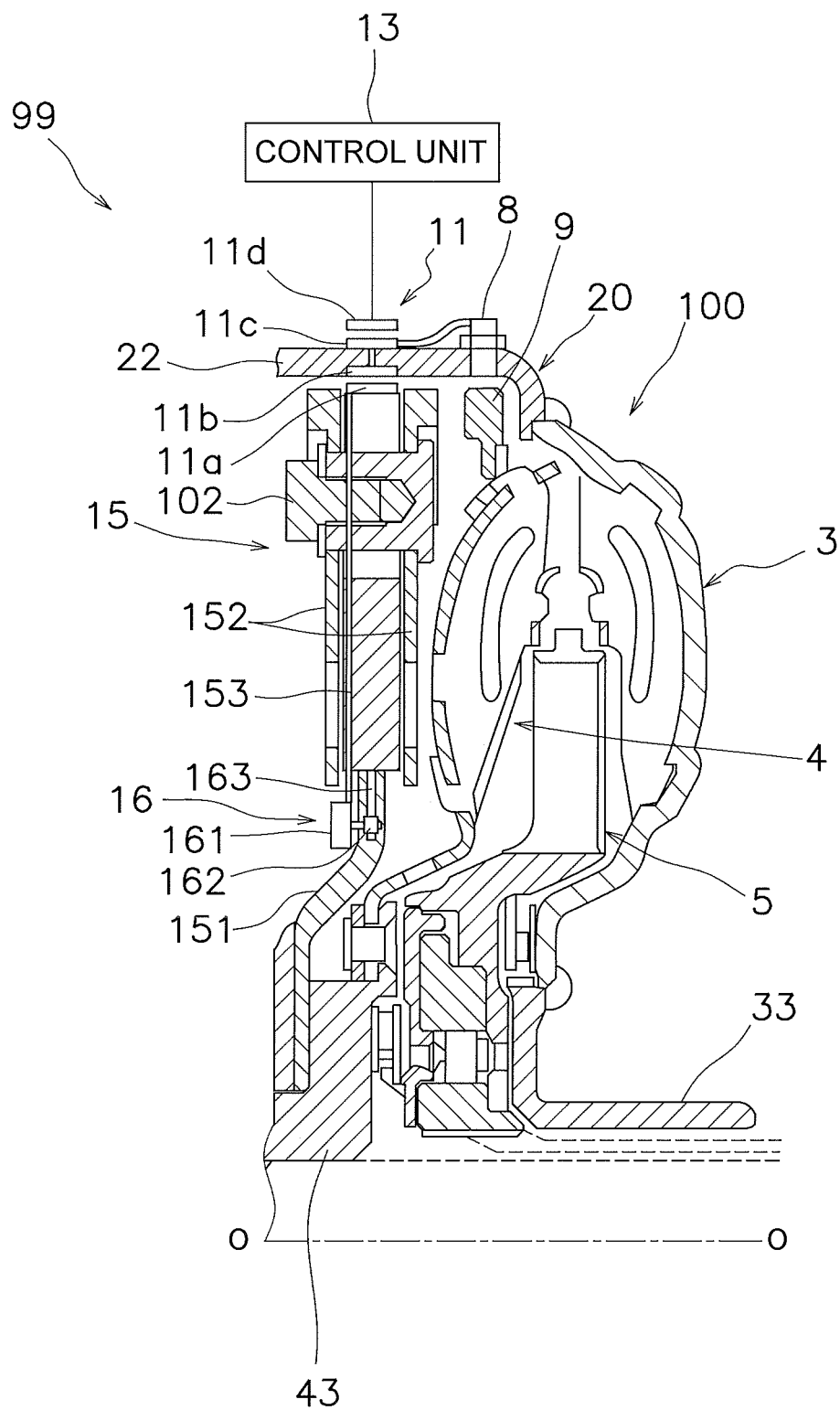
FIG. 2 is an enlarged sectional view of the power transmission device.

As shown in FIG. 2, the dynamic vibration absorbing device 15 includes a body member 151, a pair of inertia members 152, a plurality of centrifugal elements 153, and a cam mechanism 154 (an example of a conversion mechanism).

The body member 151 has a disc shape with a through hole formed centrally. The body member 151 is attached to the turbine 4. More specifically, an inner peripheral end part of the body member 151 is attached to the turbine hub 43. For example, the body member 151 and the turbine hub 43 are fixed together by welding or the like.

The body member 151 includes a plurality of protrusions 155 protruding outward in the radial direction at the outer peripheral end part. The protrusions 155 are disposed spaced apart in the circumferential direction from each other.

The inertia members 152 are ring-shaped plates. The pair of inertia members 152 is coupled to each other by a rivet 102 and the body member 151 and the centrifugal elements 153 are held therebetween. The inertia members 152 are rotatably disposed together with the body member 151.

Figure 3:
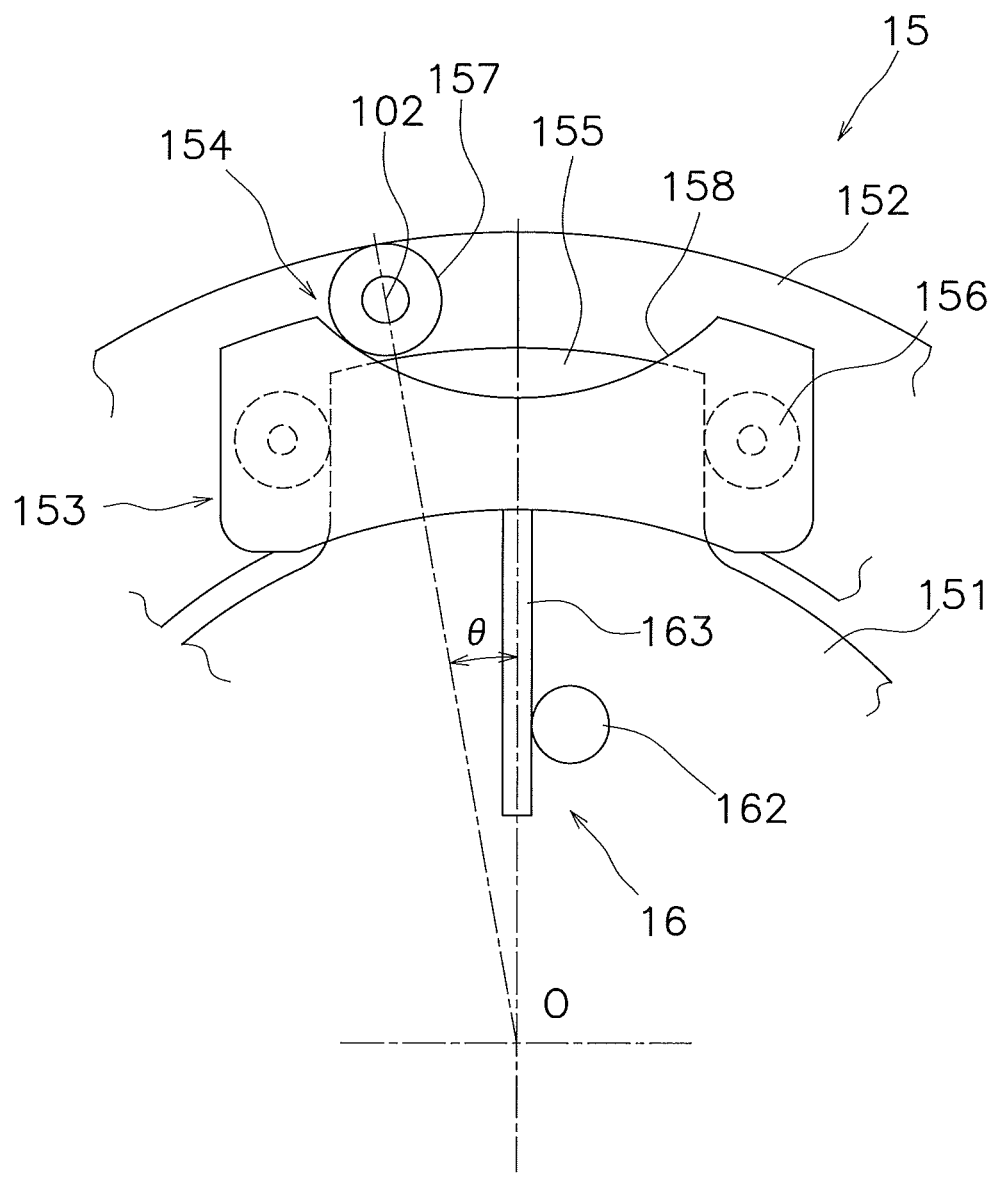
FIG. 3 is an enlarged view of a dynamic vibration absorbing device.

As shown in FIG. 3, the inertia members 152 can rotate relative to the body member 151 within a predetermined range of the torsional angle. Note that in the dynamic vibration absorbing device 15 shown in FIG. 3, the inertia members 152 are twisted by an angle θ with respect to the body member 151.

The centrifugal element 153 is slidable in the radial direction along the protrusions 155 of the body member 151.

More specifically, the centrifugal element 153 has a pair of guide rollers 156. The protrusion 155 is held between the pair of guide rollers 156. As the guide rollers 156 roll on the side surfaces of the protrusion 155, the centrifugal elements 153 can move in the radial direction along the protrusion 155.

The cam mechanism 154 includes a roller 157 as a cam follower and a cam 158. The roller 157 is fitted on an outer periphery of the body part of the rivet 102. That is, the roller 157 is supported by the rivet 102. It is to be noted that, preferably, the roller 157 is rotatably attached to the rivet 102 but can be non-rotatable.

The cam 158 is formed on an outer peripheral surface of the centrifugal element 153. Recessed inward in the radial direction, the cam 158 is an arcuate surface against which the roller 157 abuts. When the body member 151 and the inertia member 152 rotate relative to each other, the roller 157 moves along the cam 158.

When a rotational phase difference occurs between the body member 151 and the inertia member 152, the centrifugal force generated on the centrifugal element 153 is converted into a force in the circumferential direction due to the contact between the roller 157 and the cam 158 such that the rotational phase difference is small. Specifically, a configuration is adopted in which the centrifugal force generated on the centrifugal element 153 causes the cam 158 to push the roller 157 radially outward, thereby returning the roller 157 and the inertia member 152 to the position before being twisted.

[Actuator]

As shown in FIG. 2, an actuator 16 is configured to apply an assisting force to the centrifugal force by the centrifugal element 153. The actuator 16 is attached to the body member 151 of the dynamic vibration absorbing device 15. For example, the actuator 16 includes an electric motor 161, a pinion gear 162, and a rack 163. The pinion gear 162 is attached to an output shaft of the electric motor 161. The rack 163 is attached to the centrifugal element 153. The pinion gear 162 and the rack 163 are meshed with each other. Driving the electric motor 161 and moving the rack 163 radially outward imparts the assisting force for increasing the centrifugal force of the centrifugal element 153. On the other hand, the electric motor 161 is reversely driven to move the rack 163 inward in the radial direction, thereby imparting an assisting force for decreasing the centrifugal force of the centrifugal element 153.

[Rotation Sensor]

The rotation sensor 8 is attached to the housing 20. More specifically, the rotation sensor 8 is attached to an outer peripheral wall portion of the housing 20. That is, the rotation sensor 8 is attached to the first tubular part 22 of the front cover 2.

The rotation sensor 8 detects information regarding the rotation fluctuation of the turbine 4. Specifically, the rotation sensor 8 detects a rotational speed per unit time of the turbine 4 (hereinafter simply referred to as the "rotational speed"). The rotation sensor 8 is constituted by, for example, a rotary encoder or the like. The rotation sensor 8 is exposed in the housing 20. The rotation sensor 8 is disposed so as to face a detected part 9 attached to the turbine 4. The detected part 9 has a plurality of recesses formed on the outer circumferential surface at intervals in the circumferential direction. The detected part 9 is, for example, a gear. It is to be noted that the rotation sensor 8 corresponds to the rotation fluctuation detecting unit of the present disclosure.

[Power Supply Unit]

The power supply unit 11 is configured to supply power to the rotation sensor 8 and the actuator 16. The power supply unit 11 includes a first power receiving unit 11a, a first power transmitting unit 11b, a second power receiving unit 11c, and a second power transmitting unit 11d. For example, the first power receiving unit 11a and the second power receiving unit 11c are configured by power receiving coils, and the first power transmitting unit 11b and the second power transmitting unit 11d are configured by power transmission coils.

The first power receiving unit 11a is electrically connected to the actuator 16. For example, the first power receiving unit 11a is wire connected to the actuator 16 with an electric wire or the like. The first power receiving section 11a is attached to an outer peripheral surface of the dynamic vibration absorbing device 15. More specifically, the first power receiving unit 11a is attached to the outer peripheral surface of the body member 151.

The first power transmitting unit 11b is attached to the inner peripheral surface of the housing 20. More specifically, the first power transmitting unit 11b is attached to the inner peripheral surface of the first tubular part 22 of the front cover 2. The first power transmitting unit 11b is disposed at an interval from the first power receiving unit 11a in the radial direction. The first power transmitting unit 11b is configured to transmit power to the first power receiving unit 11a in a non-contact manner.

The second power receiving unit 11c is attached to the outer peripheral surface of the housing 20. More specifically, the second power receiving unit 11c is attached to an outer peripheral surface of the first tubular part 22 of the front cover 2. The second power receiving unit 11c is electrically connected to the first power transmitting unit 11b. In addition, the second power receiving unit 11c is also electrically connected to the rotation sensor 8. For example, the second power receiving unit 11c is wire connected to the first power transmitting unit 11b and the rotation sensor 8 by electric wires or the like.

The second power transmitting unit 11d is disposed radially outward of the second power receiving unit 11c. The second power transmitting unit 11d is disposed at an interval from the second power receiving unit 11c in the radial direction. The second power transmitting unit 11d is attached to, for example, an inner wall surface of the housing 20 accommodating the torque converter 100. The second power transmitting unit 11d is configured to transmit power to the second power receiving unit 11c in a non-contact manner.

Each of the power transmitting units 11b and 11d transmits power to the power receiving units 11a and 11c by wireless power supply. It is to be noted that the wireless power supplying system between each of the power transmitting units 11b and 11d and each of the power receiving units 11a and 11c can be a magnetic field coupling system, an electric field coupling system, or an electromagnetic field coupling system.

[Control Unit]

Based on the rotational speed of the turbine 4 detected by the rotation sensor 8, the control unit 13 controls the dynamic vibration absorbing device 15 so as to reduce the rotational fluctuation. Note that the control unit 13 can be constituted by, for example, an ECU (engine control unit) or the like.

The control unit 13 obtains the rotational speed of the turbine 4 detected by the rotation sensor 8. Then, the control unit 13 calculates the rotational fluctuation of the turbine 4 based on the rotational speed of the turbine 4.

Figure 4:
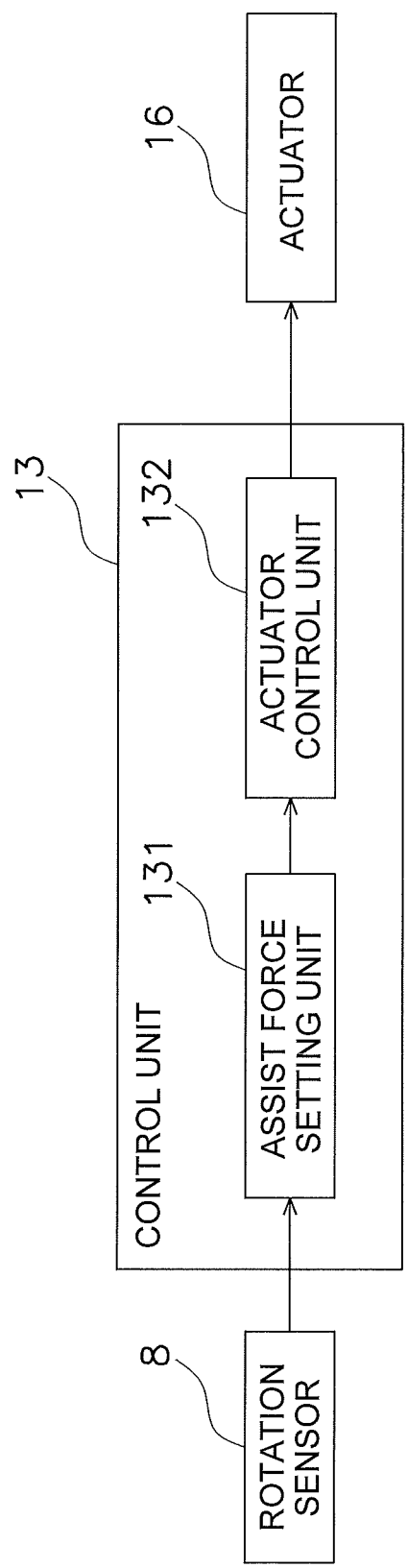
FIG. 4 is a functional block diagram of a control unit.

Based on the calculated rotational fluctuation, the control unit 13 controls the dynamic vibration absorbing device 15 so as to reduce the rotational fluctuation. For example, as shown in FIG. 4, the control unit 13 includes an assist force setting unit 131 and an actuator control unit 132. The assist force setting unit 131 sets the assist force so as to reduce the rotational fluctuation. Further, the assist force setting unit 131 calculates the rotational fluctuation based on the rotational speed detected by the rotation sensor 8, and sets the assist force based on the rotational fluctuation.

The actuator control unit 132 controls the actuator 16 so as to apply the assist force set by the assist force setting unit 131 to the centrifugal element 153. Specifically, the actuator control unit 132 sets the driving force of the motor 161, that is, the assisting force, based on the amount of direct current supplied to the motor 161 of the actuator 16, the duty ratio of the AC signal, and the like.

When it has been determined that the calculated rotational fluctuation of the turbine 4 exceeds a preset first threshold value, the control unit 13 can execute processing such as prohibiting the relative rotation of the inertia member 152 with respect to the body member 151 of the dynamic vibration absorbing device 15 to thereby stop or reduce the relative rotation.

Figure 5:
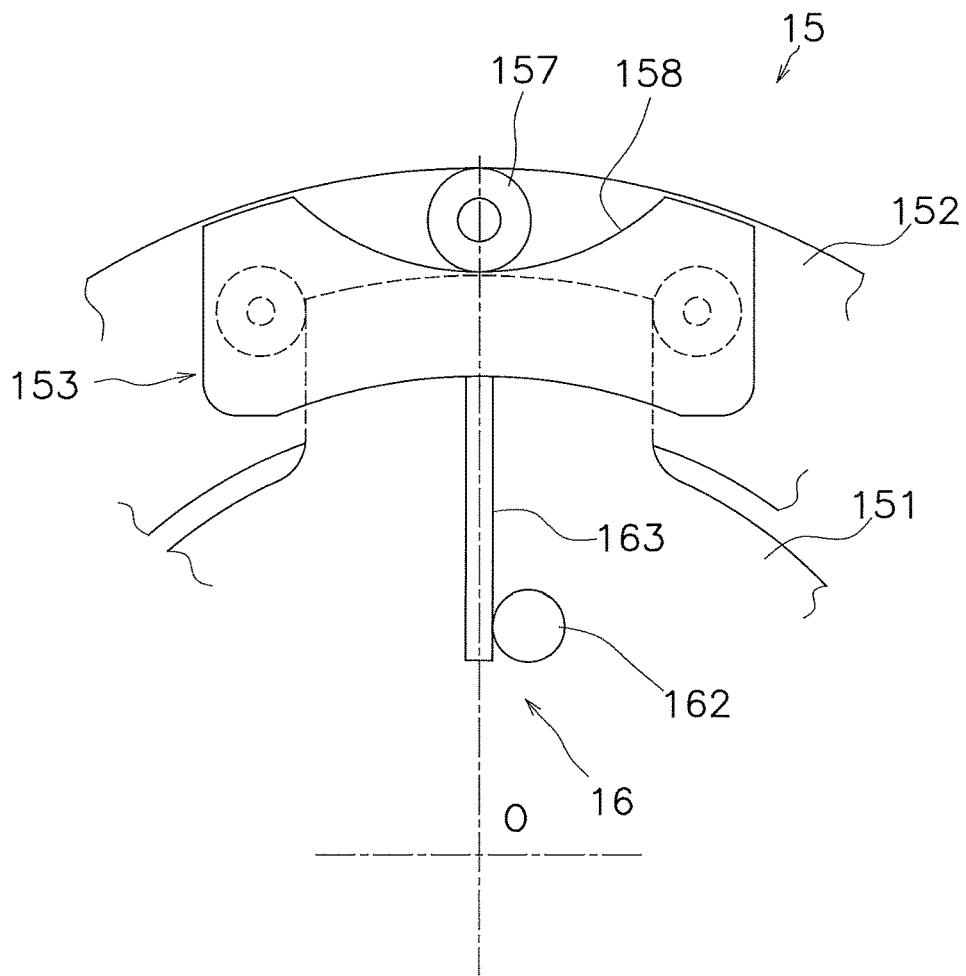
FIG. 5 is an enlarged view of a dynamic vibration absorbing device in a locked state.

For example, as shown in FIG. 5, the control unit 13 drives the actuator 16 to move the centrifugal element 153 radially outward thereby causing the cam 158 to press the roller 157 radially outward. With this configuration, the inertia member 152 can be restrained from rotating relative to the body member 151. In addition, the control unit 13 need not control the dynamic vibration absorbing 15 when the value of the calculated rotational variation is less than a preset second threshold value.

Figure 6:
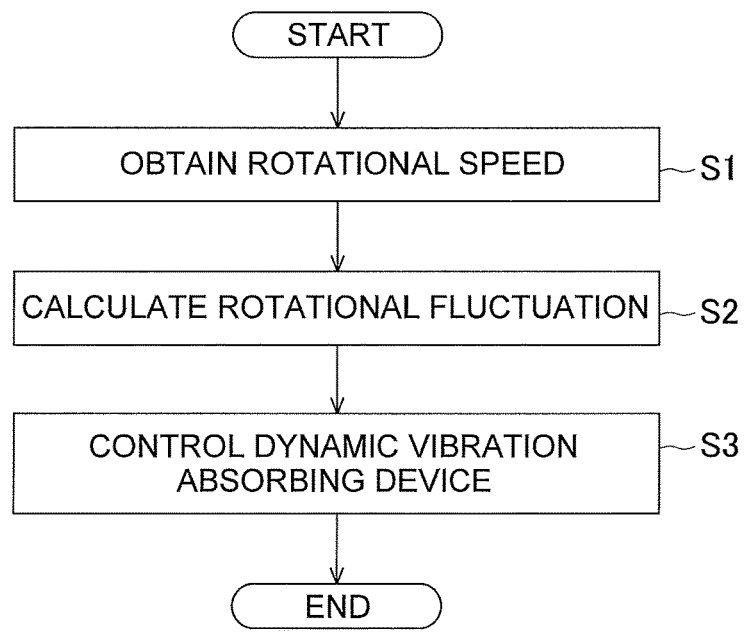
FIG. 6 is a flowchart showing an operation of the control unit.

Next, an operation of the control unit 13 will be described. First, as shown in FIG. 6, the control unit 13 obtains a rotational speed of the turbine 4 detected by the rotation sensor 8 by wireless communication (Step S1). For this wireless communication, a wireless chip and an antenna (not shown) are mounted to the torque converter 100 and an antenna (not shown) is also mounted to the control unit 13 to enable the construction of a telemetry system that performs wireless communication of digital modulation method or analog modulation method. Note that this wireless communication can be a load modulation communication method via the first power receiving unit 11a, the first power transmitting unit 11b, the second power receiving unit 11c, and the second power transmitting unit 11d.

Next, the control unit 13 calculates a rotational fluctuation of the turbine 4 based on the obtained rotational speed of the turbine 4 (Step S2).

Next, the control unit 13 controls the dynamic vibration absorbing device 15 based on the calculated rotational fluctuation (Step S3). For example, the control unit 13 controls the actuator 16 to apply an assisting force to the centrifugal element 153 of the dynamic vibration absorbing device 15, thereby controlling the dynamic vibration absorbing device 15. It should be noted that the operation of the control unit 13 can be performed not only when the lock-up device 10 is in the lock-up ON state but also when the lock-up device 10 is in the lock-up OFF state.

EXAMPLE MODIFICATIONS

An embodiment of the present disclosure has been described above; however, the present disclosure is not limited thereto, and various modifications are possible without departing from the spirit of the present disclosure.

Example Modification 1

In the aforementioned embodiment, the clutch part 6 corresponds to the input member of the present disclosure and the turbine 4 corresponds to the output member of the present disclosure; however, the present disclosure is not limited thereto. For example, the turbine 4 can serve as both the input member and the output member of the present disclosure.

Example Modification 2

Figure 7:
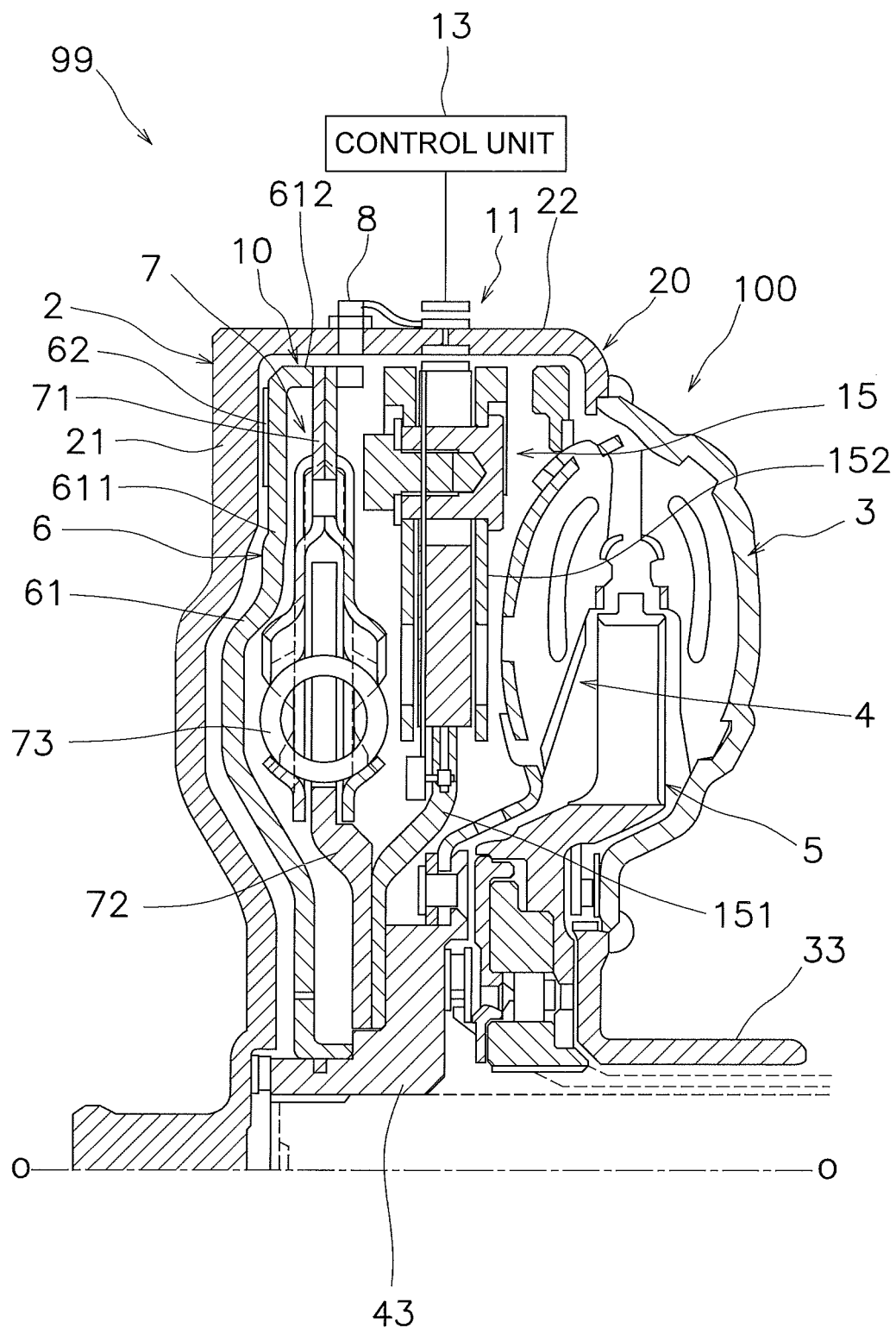
FIG. 7 is a cross-sectional view of a power transmission device according to a modified example.

In the aforementioned embodiment, the control unit 13 controls the dynamic vibration absorbing device 15 based on the rotational fluctuation of the turbine 4; however, the present disclosure is not limited thereto. For example, as shown in FIG. 7, the control unit 13 can control the dynamic vibration absorbing device 15 based on a rotational fluctuation of the piston 61. In this case, the rotation sensor 8 detects a rotational speed of the piston 61. A second tubular part 612 of the piston 61 has a plurality of grooves formed at intervals in the circumferential direction so as to mesh with the outer circumferential end part of the drive plate 71. This configuration allows the rotation sensor 8 to detect the rotational speed of the piston 61 by using the plurality of grooves of the second tubular part 612.

Example Modification 3

Figure 8:
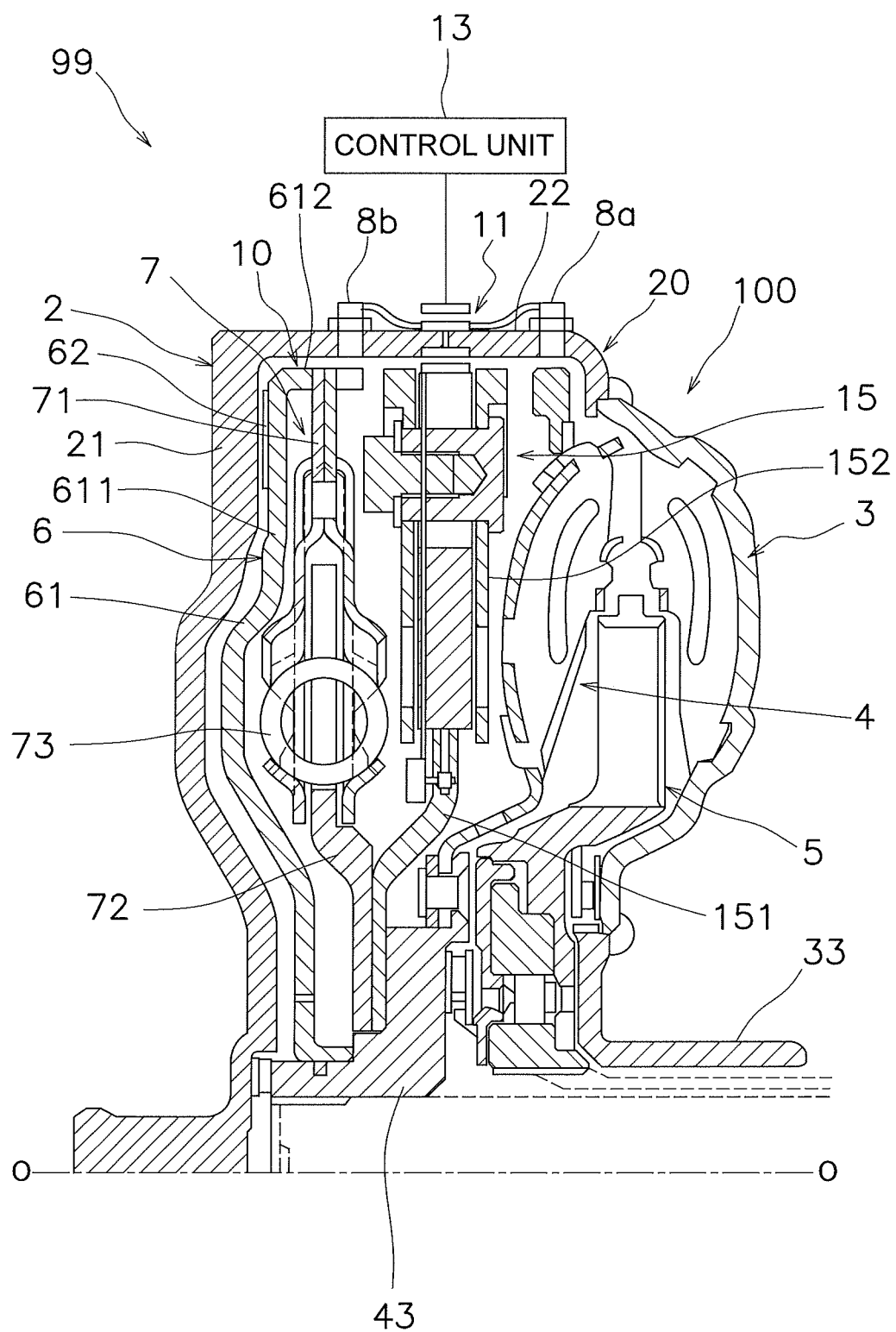
FIG. 8 is a cross-sectional view of a power transmission device according to a modified example.

As shown in FIG. 8, the control unit 13 can control the dynamic vibration absorbing device 15 based on rotational fluctuations of the turbine 4 and the piston 61. Specifically, the power transmission device 99 includes two rotation sensors; a first rotation sensor 8a and a second rotation sensor 8b. The first rotation sensor 8a detects a rotational speed of the turbine 4 and the second rotation sensor 8b detects a rotational speed of the piston 61. Then, the control unit 13 calculates the rotational fluctuation of the turbine 4 based on the rotational speed of the turbine 4 detected by the first rotation sensor 8a, and calculates the rotational fluctuation of the piston 61 based on the rotational speed of the piston 61 detected by the second rotation sensor 8b. Then, the control unit 13 controls the dynamic vibration absorbing device 15 based on these rotational fluctuations.

Example Modification 4

Figure 9:
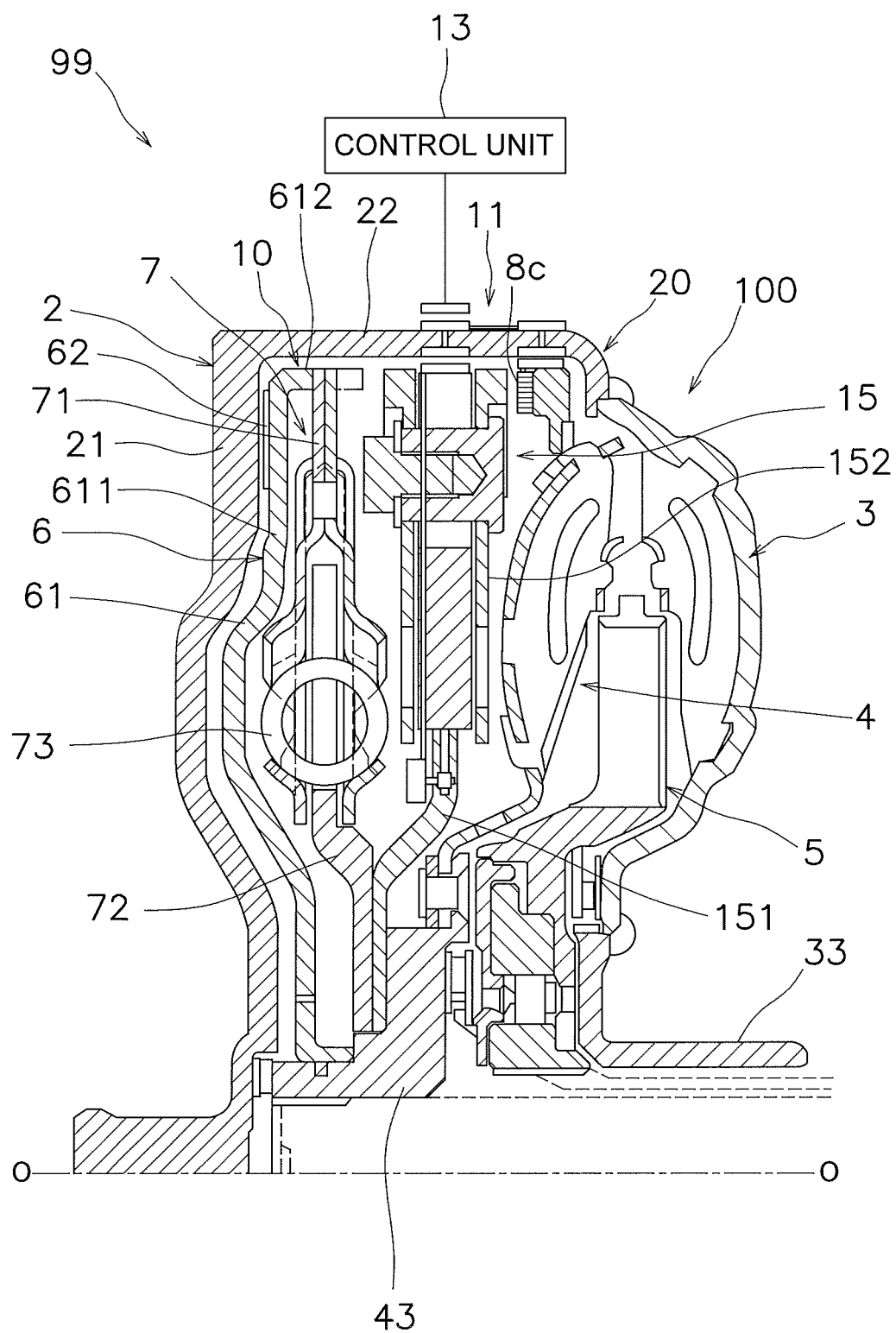
FIG. 9 is a cross-sectional view of a power transmission device according to a modified example.

In the aforementioned embodiment, the rotation sensor 8 is exemplified as the rotation fluctuation detecting unit that detects the information regarding the rotational fluctuation, but the rotation fluctuation detecting unit can be another sensor. For example, as shown in FIG. 9, the rotation fluctuation detecting unit can be an acceleration sensor 8c. The acceleration sensor 8c is attached to the turbine 4 and detects the angular acceleration of the turbine 4. Then, the control unit 13 can calculate the rotational fluctuation of the turbine 4 based on the angular acceleration of the turbine 4 detected by the acceleration sensor 8c. In addition, the rotation fluctuation detecting unit can be a sensor such as a speed sensor or a displacement sensor.

Example Modification 5

In the aforementioned embodiment, the control unit 13 controls the dynamic vibration absorbing device 15 by applying an assisting force to the centrifugal element 153 of the dynamic vibration absorbing device 15; however, the method of controlling the dynamic vibration absorbing device 15 by the control unit 13 is not limited thereto. For example, the control unit 13 can control the dynamic vibration absorbing device 15 by other means such as changing the radial position of the inertia member 152 of the dynamic vibration absorbing device 15 and the inertia moment of the inertia member 152.

Example Modification 6

The outer peripheral wall portion of the housing 20 is mainly constituted by the first tubular part 22 of the front cover 2; however, the present disclosure is not particularly limited thereto. For example, the impeller shell 31 can include a disc part and a tubular part like the front cover 2. A configuration can be adopted in which the tubular part of the impeller shell 31 constitutes the outer peripheral wall portion of the housing 20, or the outer peripheral wall portion of the housing 20 can be formed by both the first tubular part 22 of the front cover 2 and the tubular part of the impeller shell 31.

Example Modification 7

The present disclosure is applicable not only to the above described torque converter but also to other devices to which a dynamic vibration absorbing device can be attached, such as a clutch device and a dual mass wheel.

REFERENCE SIGNS LIST

8 Rotation sensor
13 Control unit
15 Dynamic vibration absorbing device
20 Housing
99 Power transmission device
100 Torque converter
151 Body member
152 Inertia member

What is claimed is:

1. A power transmission device for transmitting a torque from a drive source to a drive wheel, the power transmission device comprising:
    an input member rotatably disposed and configured to receive the torque inputted from the drive source;
    an output member configured to output the torque, inputted to the input member, to the drive wheel;
    a dynamic vibration absorbing device disposed in a power transmission path including the input member and the output member, the dynamic vibration absorbing device including a cam mechanism having an arcuate cam surface;
    a rotation fluctuation detecting unit configured to detect information regarding a rotational fluctuation in at least one of the input member and the output member; and
    a control unit programmed to perform active control of the dynamic vibration absorbing device via the cam mechanism so as to reduce the rotational fluctuation based on the information regarding the rotational fluctuation detected by the rotational fluctuation detecting unit.

2. The power transmission device according to claim 1, further comprising
    a housing accommodating the input member, the output member, and the dynamic vibration absorbing device.

3. The power transmission device according to claim 2, wherein
the rotation fluctuation detecting unit is exposed in the housing.

4. The power transmission device according to claim 1, wherein
the dynamic vibration absorbing device includes a body member and an inertia member rotatable within a range of a predetermined torsional angle relative to the body member; and
the control unit is further programmed to prohibit the inertia member from rotating relative to the body member when it is determined that the rotational fluctuation of the input member or the output member exceeds a threshold value based on the information regarding the rotational fluctuation detected by the rotational fluctuation detecting unit.

* * * * *